United States Patent
Hutchinson

(10) Patent No.: US 12,403,831 B2
(45) Date of Patent: Sep. 2, 2025

(54) THREE DIMENSION WIND SPEED DETECTION USING PITOT TUBE FOR AUTOMATED VEHICLES

(71) Applicant: TORC Robotics, Inc., Blacksburg, VA (US)

(72) Inventor: John Hutchinson, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 286 days.

(21) Appl. No.: 18/129,275

(22) Filed: Mar. 31, 2023

(65) Prior Publication Data

US 2024/0278722 A1    Aug. 22, 2024

Related U.S. Application Data

(60) Provisional application No. 63/446,714, filed on Feb. 17, 2023.

(51) Int. Cl.

| | |
|---|---|
| *B60W 60/00* | (2020.01) |
| *B60R 1/076* | (2006.01) |
| *B60R 1/12* | (2006.01) |
| *G01P 5/165* | (2006.01) |
| *B60W 10/18* | (2012.01) |
| *B60W 10/20* | (2006.01) |

(52) U.S. Cl.
CPC ............. *B60R 1/12* (2013.01); *B60R 1/076* (2013.01); *B60W 60/001* (2020.02); *G01P 5/165* (2013.01); *B60R 2001/1223* (2013.01); *B60W 10/18* (2013.01); *B60W 10/20* (2013.01); *B60W 2555/00* (2020.02)

(58) Field of Classification Search
CPC ... B60R 1/12; B60R 1/076; B60R 2001/1223; B60W 60/001; B60W 10/18; B60W 10/20; B60W 2555/00; G01P 5/165
See application file for complete search history.

(56) References Cited

U.S. PATENT DOCUMENTS

| | | | | |
|---|---|---|---|---|
| 5,309,139 | A * | 5/1994 | Austin | G07C 5/0825 340/459 |
| 12,122,424 | B2 * | 10/2024 | Han | B60W 60/00182 |
| 2016/0272067 | A1 * | 9/2016 | Trönnberg | B60L 3/106 |
| 2017/0361834 | A1 * | 12/2017 | Paskus | B60T 8/1708 |
| 2018/0170571 | A1 * | 6/2018 | Garde | G01L 11/02 |
| 2019/0204427 | A1 * | 7/2019 | Abari | G01S 17/86 |
| 2023/0211740 | A1 * | 7/2023 | LaCross | B60R 1/12 348/148 |

* cited by examiner

*Primary Examiner* — Masud Ahmed

(74) *Attorney, Agent, or Firm* — Armstrong Teasdale LLP

(57) ABSTRACT

Embodiments described herein include an automated vehicle having a pitot tube mounted to a side-view mirror of the automated vehicle. The pitot gathers samples of wind speed information for calculating three-dimensional wind measurements using the information gathered by the pitot tube. The pitot tube is installed at an area that offers the pitot tube access to outside "clean air," undisturbed by the vehicle's movement. A controller and/or driving software ingest the three-dimensional wind measurements and generate driving tasks of the automated vehicle based upon the three-dimensional wind measurements.

12 Claims, 3 Drawing Sheets

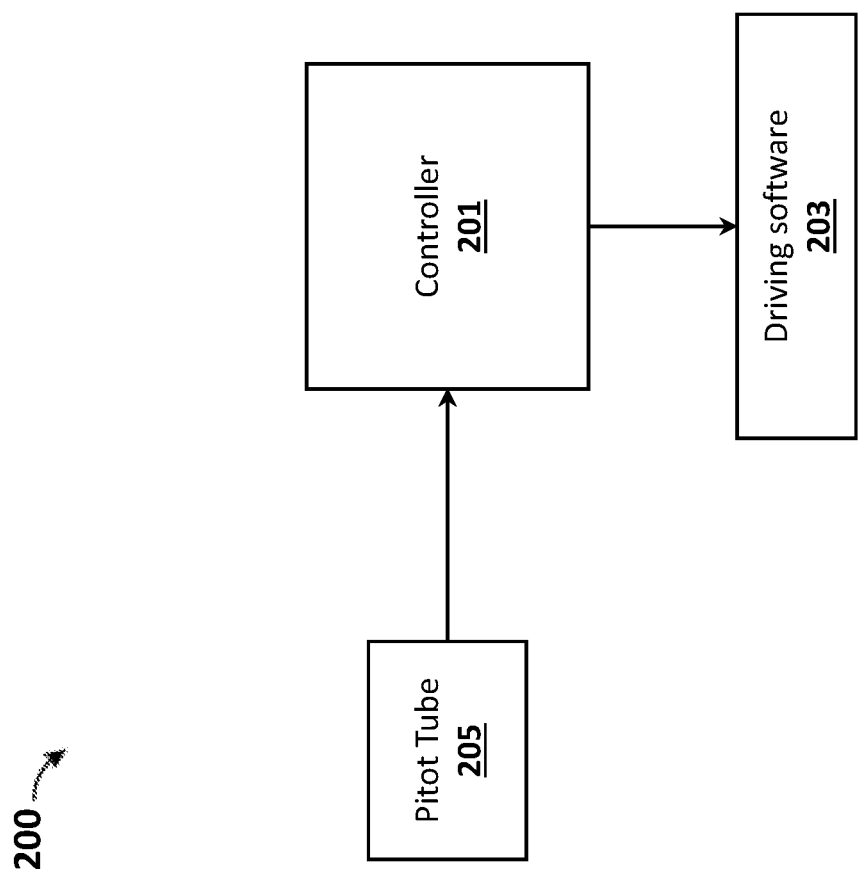

THREE DIMENSION WIND SPEED DETECTION USING PITOT TUBE FOR AUTOMATED VEHICLES

CROSS-REFERENCE TO RELATED APPLICATIONS

This application claims priority to U.S. Provisional Patent Application Ser. No. 63/446,714, filed Feb. 17, 2023, which is incorporated by reference in its entirety.

TECHNICAL FIELD

This application generally relates to monitoring and managing an automated vehicle. In particular, the application relates to managing sensor instrumentalities to accommodate improved sensor performance and improved vehicle diagnostics.

BACKGROUND

Automated vehicles must be capable of operating in a variety of environmental conditions to complete driving tasks safely. In order to adapt to current conditions, the automated vehicle must gather, analyze, and generate accurate information regarding the conditions. Some measurements, such as temperature, are trivial to capture and already exist on many conventional and automated vehicles. Other measurements pertaining to current environmental conditions, such as wind speed, present more difficulties.

To receive measurement data on wind speed, many automated and conventional vehicles rely on receiving weather data broadcasted remotely from remote weather monitoring stations. Using such weather data is frequently unreliable or ineffective for the purposes of managing operations of the automated vehicle. Oftentimes, the stations are located a significant distance from the current location of the automated vehicle. In these circumstances, the automated vehicle could be experiencing different weather conditions than the conditions indicated by the weather data; particularly different wind speed, which is highly dependent upon local geography. Additionally, a poor or non-existent communication signal between the automated vehicle and the weather station may cause communication faults, potentially resulting in a loss of information reported to the automated vehicle.

SUMMARY

Some conventional vehicle monitoring systems use sensors or probes to generate one-dimensional measurements for headwinds, which the software of those vehicles use to perform various functions, such as controlling automated (e.g., autonomous) driving tasks for managing velocity or acceleration or outputting information to a driver. The software of the automated vehicle, however, would benefit from generating and employing three-dimensional wind measurements in functions and calculations that govern the automated vehicle, such as managing the automated vehicle's lateral acceleration or jerk. The conventional vehicle systems have generated only one-dimensional wind measurements (headwind), but do not generate three-dimensional wind measurements (environmental wind conditions around the vehicle) or employ the three-dimensional wind measurements for managing the driving tasks of the automated vehicles. Typically, the conventional automated vehicle software lacked the requisite programming for generating or using three-dimensional wind measurements, and/or only safely and securely affixed a pitot tube at the front of the conventional vehicles.

What is needed is a means of calculating local wind speed installed on an automated vehicle. In particular, what is needed is a means of mounting and operating a sensor for generating three-dimensional wind speed measurements, where the sensor is mounted on the automated vehicle in manner that is resistant to deleterious environmental damage and does not compromise the sensor's effectiveness.

Embodiments described herein address the shortcomings in the art described above, and may provide any number of additional or alternative benefits as well. An automated vehicle includes pitot tubes for gathering various samples of wind speed information and a pitot-static system for calculating various types of three-dimensional wind measurements using the information gathered by the pitot tubes. A multi-hole pitot tube (or similar type of wind speed probe) is installed or otherwise affixed to the automated vehicle to gather and provide the wind speed measurements to the automated driving software of the automated vehicle. The pitot tube is installed at an area around the vehicle that offers the pitot tube access to external "clean air," undisturbed by the vehicle's movement. Preferably, the probe is situated at an area that would not pose a safety hazard to other road users in the case of an accident; does not create unnecessary drag reducing vehicle efficiency; is not vulnerable to becoming fouled or clogged; and would be easily accessible for maintenance or replacement.

For these reasons, the pitot tube (or other probe) may be installed at one or more of the vehicle's side-view mirrors. The side-view mirrors are situated at some distance away from the body of the vehicle that reduces interference from air moving around the vehicle. The side-view mirrors are also some distance away from the ground that reduces risks of debris causing damage and fouling the pitot tube. In addition, the side-view mirrors tend to be flexibly connected to the body of the vehicle, allowing the side-view mirror and pitot tube to pivot backwards upon impact, which reduces the likelihood of the pitot tube causing injury in an accident. In some embodiments, a pitot tube is installed at each side-view mirror, allowing the software of the automated vehicle to capture redundant sensor inputs.

In an embodiment, a system may comprise a pitot tube mounted to a side-view mirror of an automated vehicle and configured to generate three-dimensional wind measurements according to environmental wind conditions; and a controller electrically coupled to the pitot tube. The controller is configured to: generate wind-related data based upon the three-dimensional wind measurements received from the pitot tube; and generate a driving task based upon the wind-related data, the driving task including machine-executable instructions causing the controller to operate a electromechanical component of the automated vehicle according to current local environmental conditions indicated by the three-dimensional wind measurements.

In another embodiment, a method may comprise generating, by at least one processor electrically coupled to a pitot tube mounted to a side-view mirror of an automated vehicle and configured to generate three-dimensional wind measurements according to environmental wind conditions, wind-related data based upon the three-dimensional wind measurements received from the pitot tube; and generating, by the at least one processor, a driving task based upon the wind-related data, the driving task including machine-executable instructions causing the controller to operate a electromechanical component of the automated vehicle according to current local environmental conditions indicated by the three-dimensional wind measurements.

In yet another embodiment, a system may comprise a controller comprising at least one processor and electrically coupled to a pitot tube mounted to a side-view mirror of an automated vehicle, and configured to: generate wind-related data based upon three-dimensional wind measurements received from the pitot tube; and generate a driving task based upon wind-related data, the driving task including machine-executable instructions causing the controller to operate a electromechanical component of the automated vehicle according to current local environmental conditions indicated by the three-dimensional wind measurements.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views. The accompanying drawings, which are incorporated in and constitute a part of this specification, illustrate various exemplary embodiments and together with the description, serve to explain the principles of the disclosed embodiments.

FIG. 2 is a block diagram depicting electronic signaling connections between electronic components of an automated vehicle, according to an embodiment.

DETAILED DESCRIPTION

Figure 1A:
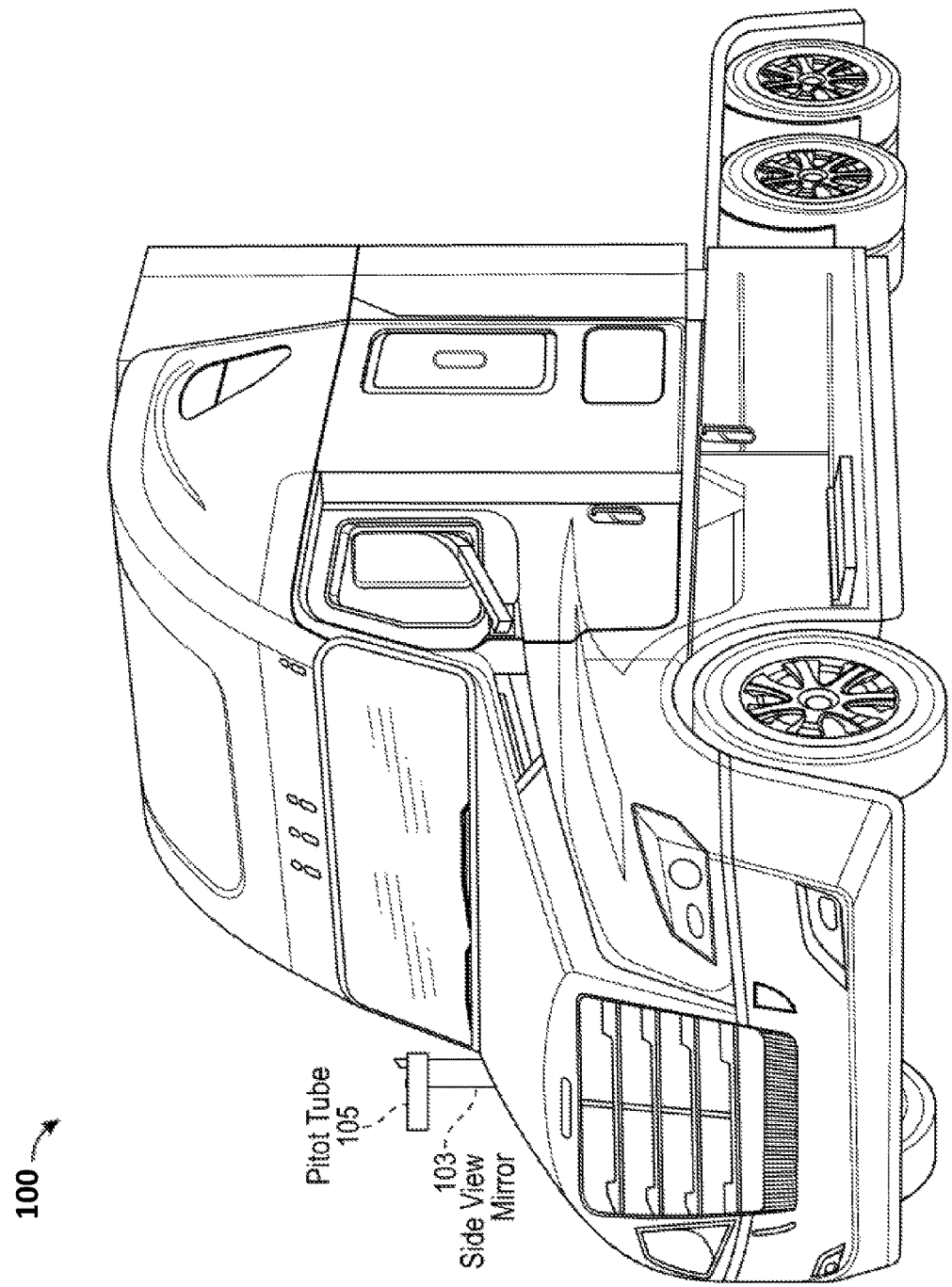
FIG. 1A shows an automated vehicle comprising a side-view mirror having a pitot tube attached or otherwise mounted to the side-view mirror, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Figure 1B:
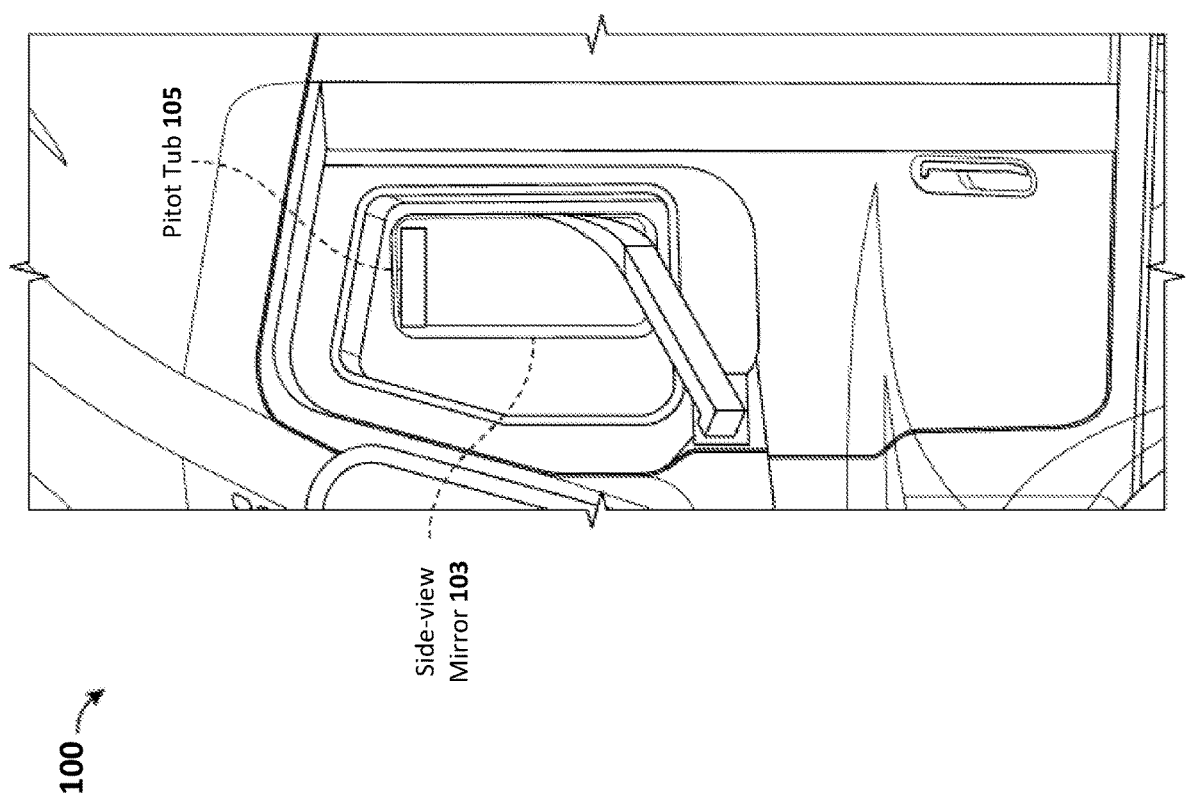
FIG. 1B shows blow-up image of the automated vehicle in FIG. 1A, focusing on a region of the side-view mirror having the pitot tube, according to an embodiment.

FIGS. 1A-1B show an automated vehicle (shown as a truck 100) having one or more side-view mirrors 103. An attaching mechanism installs or affixes a multi-hole pitot tube 105 (or similar probe) to a side-view mirror 103.

Although the example embodiment describes a side-view mirror, it is intended that the pitot tube 105 can be installed in or on a housing in a similar or nearby location, even if the automated vehicle 100 does not have a side-view mirror 103. In such a configuration, the pitot tube may have a housing to provide the functionality of placement on a side-view mirror.

The pitot tube 105 is situated on the side-view mirror 103 at an area with undisturbed air. The pitot tube 105 is coupled electrically to a pitot-static system or similar sensor-handling computing subsystem (not shown), and/or to a controller or similar processor device (not shown). The electrical connections allow the pitot tube 105 to gather and transmit wind speed measurements to the pitot-static system or to the controller.

The pitot-static system may process, translate, or otherwise generate wind-related data, which the controller ingests as three-dimensional wind measurements. The pitot-static system or similar programming executed by the controller receives the wind measurements from the pitot tube 105, and calculates the various types of three-dimensional wind measurements based upon the information gathered by the pitot tube 105.

The controller of the truck 100 performs various operations for managing the subsystems and behaviors of the truck 100. The controller may, for example, control the operations of the sensors or probes (e.g., pitot tube 105); manage the pitot-static system; and execute driving software for controlling the truck 100 in accordance with the sensor data (e.g., three-dimensional wind measurements).

In some embodiments, for additional safety, the pitot tube 105 is mounted on a spring-loaded arm, which flexibly attaches the pitot tube 105 to the side-view mirror 103. When an impact with the pitot tube occurs, the spring-loaded arm allows the pitot tube 105 to retract inside of the housing of the side-view mirror 103, or flex behind the housing of the side-view mirror 103. In this way, the spring-loaded arm reduces the likelihood of a potential injury or damage caused to the pitot tube 105. The spring-loaded arm may move or flex with a degree-of-freedom such that an off-angle impact would not cause the pitot tube 105 to bind or remain extended. Additionally or alternatively, the spring-loaded arm may also be vibration resistant, reducing the potential for the pitot tube 105 to generate false measurements.

In some embodiments, a pitot tube 105 is installed at each side-view mirror 103, allowing driving software of the truck 100 to capture redundant sensor inputs from each of the pitot tubes 105.

FIG. 2 is a block diagram depicting electronic signaling connections between electronic components of an automated vehicle 200, including a controller 201, pitot tube 205, and driving software 203. The pitot tube 205 is electrically connected to the controller 201 via any type of connections (e.g., wires, cables), where the controller 201 may execute the driving software 203 and various other programming or machine-executable instructions for performing various other functions.

The controller 201 includes a processor or other processing device comprising hardware and software components capable of executing the various programmed machine-executable instructions. The controller 201 receives, generates, or otherwise captures three-dimensional wind measurements at a given time or distance interval, at a preprogramed triggering condition of the vehicle, or in response to a command from a remote operator or administrator. As an example, the pitot tube 205 continually captures and outputs wind-measurements to the controller 201. At a given time interval, when the automated vehicle 200 starts initially, or when the automated vehicle 200 is stopped, the automated vehicle 200 may capture and generate the three-dimensional wind measurements.

The controller 201 may execute the driving software 203 of the automated vehicle 200 using the three-dimensional wind measurements. The driving software 203 instructs other electromechanical components of the automated vehicle 200 to navigate the automated vehicle 200 and perform any number of driving tasks. As an example, the controller 201 feeds the three-dimensional wind measurements into the driving software 203, which in turn calculates a predicted amount of lateral acceleration or lateral jerk caused by the wind if the automated vehicle 200 follows a predicted driveline. If the driving software 203 determines that the predicted lateral acceleration exceeds a threshold, then the driving software 203 may instruct the controller 201 to adjust the driving behavior of the automated vehicle 200. The driving software 203 may, for example, recalculate a new predicted driveline, instruct the controller 201 to follow the new predicted driveline by actuating the steering column of the automated vehicle 200, instruct the controller 201 to reduce speed by actuating the brakes, or instruct the controller 201 to increase speed by actuating the accelerator of the automated vehicle 200.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
a pitot tube configured to generate three-dimensional wind measurements according to environmental wind conditions;
a spring-loaded arm coupled to a side-view mirror of an automated vehicle and mounting the pitot tube to the side-view mirror, the spring-loaded arm configured to facilitate the pitot tube to retract upon an impact; and
a controller electrically coupled to the pitot tube, and configured to:
generate wind-related data based upon the three-dimensional wind measurements received from the pitot tube, the wind-related data including a predicted amount of lateral jerk of the automated vehicle caused by current local environmental wind conditions as indicated by the three-dimensional wind measurements, if the automated vehicle were to follow a predicted driveline; and
generate a driving task based upon the predicted amount, the driving task including machine-executable instructions causing the controller to operate an electromechanical component of the automated vehicle responsive to the predicted amount.

2. The system according to claim 1, wherein the controller executes driving software for determining the driving task based upon the predicted amount.

3. The system according to claim 1, wherein the controller is further configured to calculate a new driveline for the driving task based upon the predicted amount.

4. The system according to claim 3, wherein the controller is further configured to adjust a steering column according to the new driveline indicated by the driving task.

5. A method comprising:
generating, by at least one processor electrically coupled to a pitot tube configured to generate three-dimensional wind measurements according to environmental wind conditions, wind-related data based upon the three-dimensional wind measurements received from the pitot tube, the pitot tube mounted to a side-view mirror of an vehicle by a spring-loaded arm coupled to the side-view mirror and configured to facilitate the pitot tube to retract upon impact, the wind-related data including a predicted amount of lateral jerk of the automated vehicle caused by current local environmental wind conditions as indicated by the three-dimensional wind measurements, if the automated vehicle were to follow a predicted driveline; and generating, by the at least one processor, a driving task based upon the predict amount, the driving task including machine-executable instructions causing the controller to operate a electromechanical component of the automated vehicle responsive to the predicted amount.

6. The method according to claim 5, further comprising executing driving software for determining the driving task based upon the predicted amount.

7. The method according to claim 5, further comprising calculating a new driveline for the driving task based upon the predicted amount.

8. The method according to claim 7, further comprising adjusting a steering column according to the new driveline indicated by the driving task.

9. A system comprising:
a controller comprising at least one processor and electrically coupled to a pitot tube, the pitot tube mounted to a side-view mirror of an automated vehicle by a spring-loaded arm coupled to the side-view mirror, the spring-loaded arm configured to facilitate the pitot tube to retract upon an impact, wherein the controller is configured to:
generate wind-related data based upon three-dimensional wind measurements received from the pitot tube, the wind-related data including a predicted amount of lateral jerk of the automated vehicle caused by current local environmental wind conditions as indicated by the three-dimensional wind measurements, if the automated vehicle were to follow a predicted driveline; and
generate a driving task based upon the predicted amount, the driving task including machine-executable instructions causing the controller to operate a electromechanical component of the automated vehicle responsive to the predicted amount.

10. The system according to claim 9, wherein the controller is configured to execute driving software for determining the driving task based upon the predicted amount.

11. The system according to claim 9, wherein the controller is further configured to calculate a new driveline for the driving task based upon the predicted amount.

12. The system according to claim 11, wherein the controller is further configured to adjust a steering column according to the new driveline indicated by the driving task.

* * * * *